C. W. LEVALLEY.
TRANSMISSION GEARING.
APPLICATION FILED JAN. 16, 1912.

1,151,483.

Patented Aug. 24, 1915.
2 SHEETS—SHEET 1.

Witnesses
J. Milton Jester
L. C. Briddy

Inventor
Christopher W. Levalley
By John S. Barker
Attorney

C. W. LEVALLEY.
TRANSMISSION GEARING.
APPLICATION FILED JAN. 16, 1912.

1,151,483.

Patented Aug. 24, 1915.
2 SHEETS—SHEET 2.

Witnesses
J. Milton Jester
L. C. Brady

Inventor
Christopher W. Levalley
By John S. Barker
Attorney

UNITED STATES PATENT OFFICE.

CHRISTOPHER W. LEVALLEY, OF MILWAUKEE, WISCONSIN.

TRANSMISSION-GEARING.

1,151,483.   Specification of Letters Patent.   Patented Aug. 24, 1915.

Application filed January 16, 1912. Serial No. 671,409.

*To all whom it may concern:*

Be it known that I, CHRISTOPHER W. LEVALLEY, a citizen of the United States, residing at Milwaukee, in the county of Milwaukee and State of Wisconsin, have invented certain new and useful Improvements in Transmission-Gearing, of which the following is a specification.

My invention relates to transmission gearing of that type in which two driven members, as for instance, the two parts of an axle, or two traction wheels, are connected with a single motor-driven part in order that both driven parts may rotate at like speed, or either part or member may turn at an accelerated speed, and in so doing, release itself from driving connection with the motor-connected part, while the other, slower moving, member remains in connection therewith; and it has for its object to improve gearing of this kind in the manner hereinafter pointed out.

Figure 1:
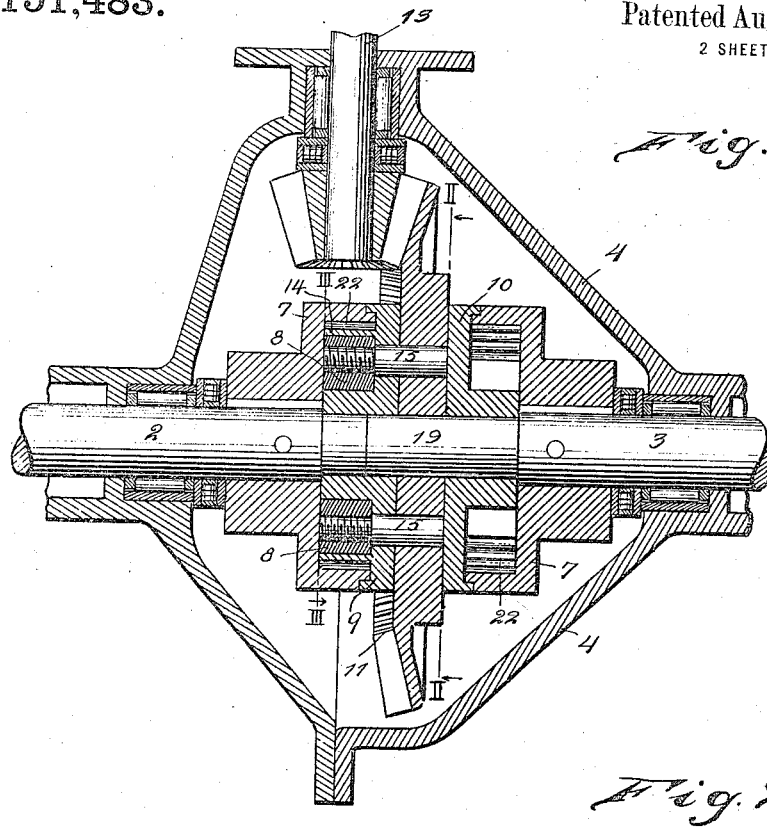
Figure 2:
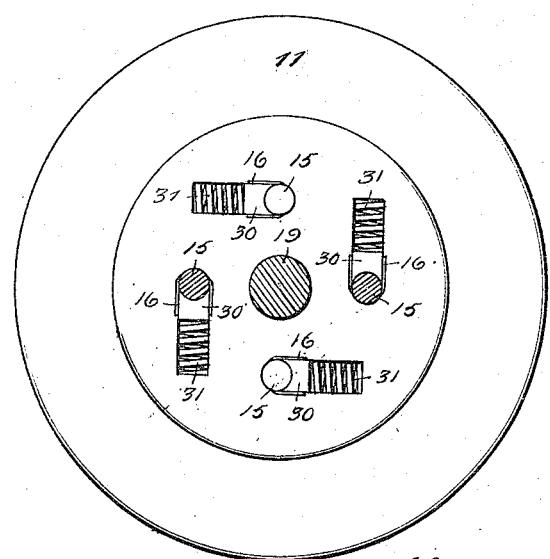
Figure 3:
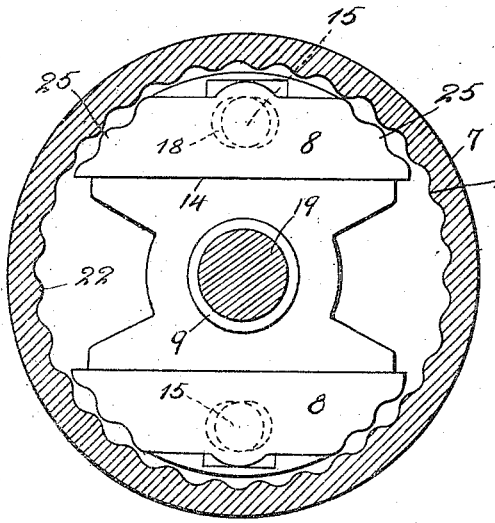
Figure 4:
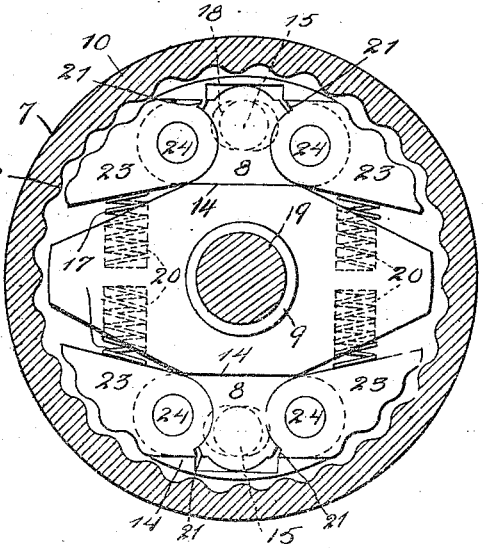
Figure 5:
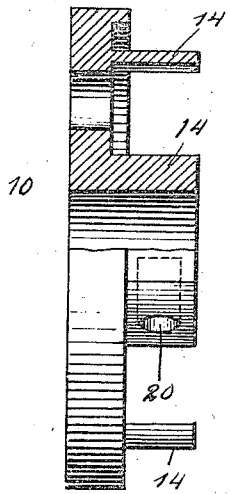
Figure 6:
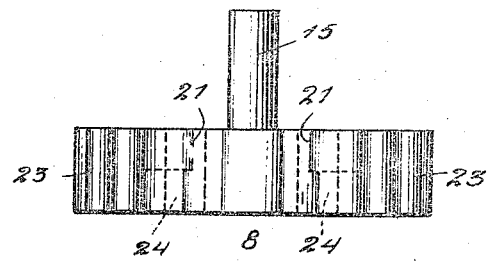

In the accompanying drawings, in which my invention is illustrated, Figure 1 is a horizontal sectional view of a transmission gearing embodying my invention and adapted to be used as part of the driving mechanism of a motor vehicle. Fig. 2 is a transverse sectional view taken on the line II—II of Fig. 1. Fig. 3 is a cross sectional view taken on the line III—III of Fig. 1. Fig. 4 is a transverse vertical section illustrating a different embodiment of the invention from that shown in the views already described. Fig. 5 is a detail view, partly in elevation and partly in central vertical section, illustrating one of the supporting disks of the apparatus. Fig. 6 is a detail view illustrating the clutch shoe shown in Fig. 3 separated from connection with other parts of the mechanism.

In the drawings, 2, 3, indicate respectively, the sections of a divided driven shaft, which may be the rear axle of an automobile, to the outer ends of which the traction wheels are secured. The inner ends of these shaft sections are suitably supported, preferably within a casing, 4, which is represented as being provided with both supporting and thrust bearings for the shaft. The shaft sections preferably abut and are reduced in diameter, as indicated at 19. To each section there is secured, in any suitable manner, a clutch member 7, of the driving mechanism, the hub of which is secured fast to the shaft, preferably at the extreme inner end of the unreduced part thereof. This clutch member is formed with an inwardly projecting flange, the inner surface of which, when the clutch is not frictional but positive, as herein represented, is toothed or corrugated, as indicated at 22. Within the chamber formed by this corrugated flange is mounted the movable clutch member which, when moved into driving or operating position, engages with the corrugated portions of the clutch member, 7, but which is also adapted to occupy a position entirely free therefrom. This clutch member consists of a slide, 8, provided at each end with a working contact section which is preferably toothed or corrugated in order to better engage with the shaft-connected clutch member 7, which slide is supported so as to be movable on straight lines that are at an angle to a line radial to the fixed clutch member 5, preferably at right angles to such line. In that form of my invention represented in Fig. 4, the working or contact ends or portions 23 of the movable clutch-member 8, are pivotally supported upon pins 24. While a single movable member for each clutch is entirely feasible, I prefer to employ two, arranged diametrically opposite each other, as indicated in the drawings, as thus power is transmitted in a most satisfactory manner. These movable clutch members are supported by disks, 9, 10, located respectively between the central driving gear 11 and the clutch members 7. These latter, as represented in Fig. 1, face each other and are at such distance apart that the disks 9 and 10, and the drive gear 11, occupy practically the entire space between the inner edges of the clutch members 7, the disks being arranged to serve as closing plates for the chambers in which are located the movable clutch members. These three parts are preferably loosely mounted upon the reduced portions, 19, of the shaft sections, the abutting ends of which are preferably to one side of the central gear and lie within the hub of one of the disks, this arrangement insuring a satisfactory means for alining and supporting the inner ends of the shafts or axle. Each disk is provided with slideways 14 in which are mounted the movable clutch members, such slideways directing the movements of these parts and being located in the chamber within the clutch members 7 when the parts of the gearing are assembled. Each movable clutch member is connected with the central drive gear so as to be thereby moved either into or out of operative position. The connection between these two parts is a pin 15, which is preferably seated fast in the slide portion 8 of the movable clutch member extends through an elongated aperture 18 formed in the disk, 9 or 10 that supports such movable clutch member, and enters an aperture or slot 16 in the drive gear 11.

In order to reduce the shock incident to coupling or clutching together the driving and the driven parts of the gear, especially when the clutch members are of a positively engaging character, such as indicated in the drawings, and also to hold the movable clutch members in neutral positions, that is, out of working engagement with the shaft-connected clutch member 7 when the latter is not being positively driven, I interpose between the driving gear and each pin 15 a yielding or shock-absorbing connection. This preferably consists of a slide block 30 seated in a slot 16 formed in the drive gear 11 and held against the pin 15 by a stiff coiled spring 31, which is so formed that when it is under strain, incident to the parts being in driving connection, its convolutions come together. It is usually only necessary that the yielding, shock-absorbing connections, should be on one side of the pin 15—the side which moves toward the pin when the drive gear is turned in a forward driving direction. When the engaging ends 23 of the movable clutch member are pivotally supported, as represented in Fig. 4, they should be held outwardly, so as to be in working position, by springs 17. These are seated in sockets 20 formed therefor in the body of the disk or support, 9 or 10. Between each pivoted section 23 of the movable clutch member and the slide portion 8 thereof is a knuckle or butt joint 21 that operates to hold these parts rigidly in relation to each other, when in working or driving position.

While for some purposes it is desirable that the working ends of the sliding clutch member should be pivoted as described, it is entirely feasible, and a more simple mechanical construction, to make the movable clutch member integral, and to shape its opposite ends as indicated at 25, Fig. 3, so as to engage with the inner working surface of the clutch member 7.

The operation of the gearing may now be set forth and understood. Whenever the two sections of the shaft are being driven uniformly, as when the vehicle is moving along a straight piece of roadway, the power from the shaft 13 is transmitted through the drive gear 11, and the clutching or coupling elements of the gear, to the shaft sections 2 and 3. Should one of these shafts be caused to revolve more rapidly than the other, as is the case with the outer wheel shaft when the vehicle turns, the other section, the inner one, remains in driving connection with the motor, while the more rapidly revolving, outer, one, has its driving connection temporarily broken or interrupted, leaving it free to turn independently both of the motor and the other section of the shaft or axle, so long as it is turning or revolving more rapidly. Whenever its speed becomes the same as, or less than, that of the other section, it is immediately and automatically again brought into driving connection with the motor. This uncoupling action that takes place between the more rapidly moving shaft section and the motor, is well understood in this art and need not be further explained.

While I have illustrated the drive gear 11 as being a bevel wheel, it will be understood that the invention is not limited to this specific element of the gearing, a bevel gear being merely chosen as illustrative of a driving element, located, with reference to the other parts of the mechanism, as shown in the drawings and herein described. While I have in this specification described and illustrated positive clutches between the drive gear and the sections of the driven shaft, and my present invention comprises the specific mechanism constituting such clutches, nevertheless it will be understood that for some purposes of the invention the positive clutches herein shown and described are merely illustrative of clutch devices broadly considered, whether specifically like those shown, or different.

What I claim is:—

1. In a transmission gearing, the combination of a divided driven shaft, a clutch member carried by each section of the shaft, a drive gear turning freely with reference to the said clutch members, sliding clutch members arranged to be moved bodily and brought respectively into working engagement with the shaft-connected clutch members, slideways tangential to circles concentric with the driven shaft, for supporting and directing the movements of the clutch shoes, and means for controlling the movements of the clutch shoes interposed between them and the driving gear.

2. In a transmission gearing, the combination of a divided driven shaft, a clutch member carried by each section of the shaft, a drive gear turning freely with reference to the said shaft and clutch members, sliding clutch members connected with the driving gear and arranged to be moved bodily thereby and brought respectively into working engagement with the shaft-connected clutch members, and slideways for supporting the movable clutch members and directing the movements thereof.

3. In a transmission gearing, the combination of a driven shaft, a clutch member carried thereby, a drive gear turning freely with reference to the said clutch member, a sliding clutch member arranged to be moved bodily and to have one or the other of its ends brought into working engagement with the shaft-connected clutch member accordingly as the drive gear is turned in one direction or the other, a support for the said movable clutch member having a slideway by which its movements are directed, and means for controlling the movable clutch member, interposed between it and the drive gear.

4. In a transmission gearing, the combination of a driven shaft, a clutch member having a contact rim carried thereby, a drive gear turning freely with reference to the said clutch member, a sliding clutch member arranged within the said working rim of the shaft-connected clutch member and having its opposite ends adapted to operatively engage therewith, a supporting and directing slideway for the movable clutch member, and means for moving such clutch member bodily to bring it into working engagement with the shaft-connected clutch member, such means being interposed between the movable clutch member and the driving gear.

5. In a transmission gearing, the combination of a driven shaft, a clutch member formed with a contact rim carried thereby, a drive gear turning freely with reference to the said clutch member, a pair of sliding clutch members engaging with the contact rim of the said clutch member, they being located on opposite sides of the axis about which the said clutch member turns, means for supporting and directing the movements of the sliding clutch members and means for controlling the movements of the said clutch members, interposed between them and the driving gear.

6. In a transmission gearing, the combination of a driven shaft, a clutch member having an overhanging annular contact flange carried by the shaft, a face plate set opposite the edge of the said flange and free to move with reference to the said clutch member, a slideway carried by the said face plate and located within the said flange, a sliding clutch member guided by the said slideway arranged to be moved into working engagement with the flange of the shaft-connected clutch member, and means for controlling the movements of the movable clutch member.

7. In a transmission gearing, the combination of a driven shaft, a clutch member carried thereby, a drive gear turning freely with reference thereto, a sliding clutch member having a pivoted portion adapted to engage with the shaft-connected clutch member, a slideway for supporting and directing the movements of the clutch member, and means for moving the movable clutch member bodily to bring its pivoted portion into position to engage with the shaft-connected clutch member.

8. In a transmission gearing, the combination of a driven shaft, a clutch member having an overhanging contact flange carried by the shaft, a drive gear turning freely with reference to the said clutch member, a sliding clutch member having a pivoted portion adapted to engage with the shaft-connected clutch member, a spring for holding the pivoted portion of the sliding clutch member in working position, and means interposed between the movable clutch member and the drive gear for moving the former bodily to bring it into position to have its pivoted portion engage with the shaft-connected clutch member.

9. In a transmission gearing, the combination of a driven shaft, a clutch member carried thereby, a drive gear turning freely with reference thereto, a positively engaging movable clutch member for coacting with the shaft-connected clutch member and operative connections for operating the movable clutch member arranged between it and the drive gear, including shock-absorbing devices.

10. In a transmission gearing, the combination of a divided driven shaft, a clutch member carried by each section of the shaft, a drive gear turning freely with reference to said clutch members, sliding, positively engaging clutch members for co-acting with the said shaft-connected clutch members, and means for throwing the movable clutch members into working engagement with the shaft-connected clutch members whenever the drive gear operates, including shock-absorbing devices.

CHRISTOPHER W. LEVALLEY.

Witnesses:
 JOHN S. BARKER,
 GEO. B. PITTS.

It is hereby certified that in Letters Patent No. 1,151,483, granted August 24, 1915, upon the application of Christopher W. Levalley, of Milwaukee, Wisconsin, for an improvement in "Transmission-Gearing," an error appears in the printed specification requiring correction as follows: Page 3, line 65, claim 7, before the word "clutch" insert the word *movable;* and that the said Letters Patent should be read with this correction therein that the same may conform to the record of the case in the Patent Office.

Signed and sealed this 15th day of February, A. D., 1916.

[SEAL.]

R. F. WHITEHEAD.

*Acting Commissioner of Patents.*

Cl. 74—7.